T. Huntington.
Boat Detaching.

No. 2,478. Reissued Feb. 12, 1867.

Fig. 3. x.

Witnesses.
Jas A Servid
I. W. Huntington

Inventor.
Thos. Huntington
Per Munn & Co
Attorneys.

N. PETERS, PHOTO-LITHOGRAPHER, WASHINGTON, D. C.

United States Patent Office.

THOMAS HUNTINGTON, OF NEW ROCHELLE, NEW YORK.

*Letters Patent No.* 55,303, *dated June* 5, 1866; *reissue No.* 2,478, *dated February* 12, 1867.

IMPROVED BOAT-DETACHING TACKLE.

The Schedule referred to in these Letters Patent and making part of the same.

TO ALL WHOM IT MAY CONCERN:

Be it known that I, THOMAS HUNTINGTON, of New Rochelle, in the county of Westchester, and State of New York, have invented a new and improved Means for Detaching Boats from their Davits; and I do hereby declare that the following is a full, clear, and exact description thereof, which will enable others skilled in the art to make and use the same, reference being had to the accompanying drawings, forming part of this specification, in which—

Figure 1:
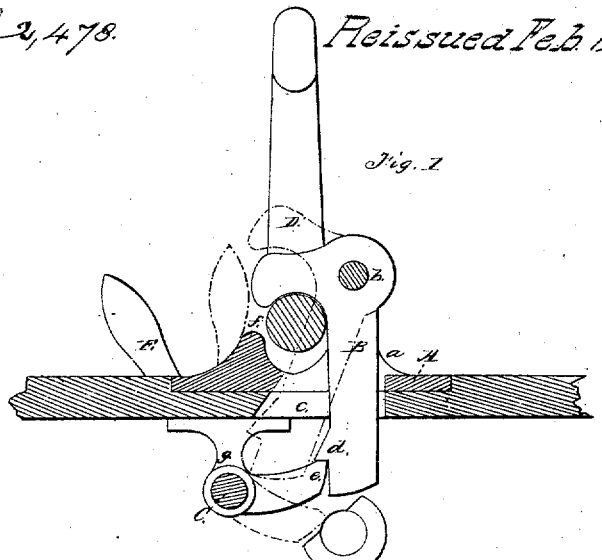
Figure 2:
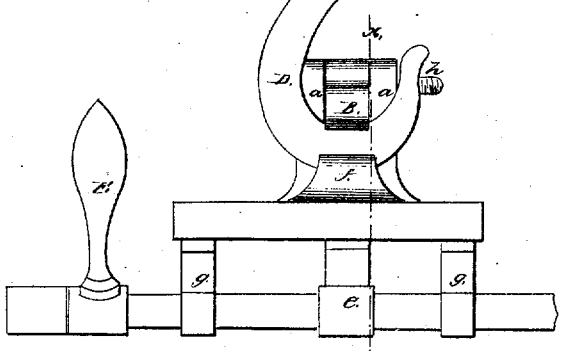
Figure 2:
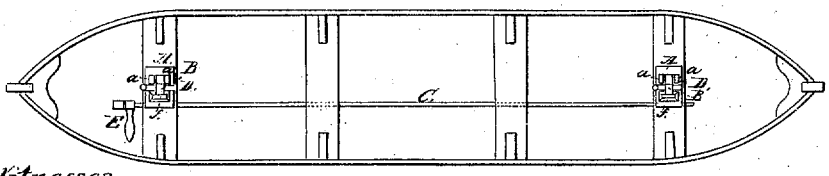

Figure 1 is a vertical section of my invention, taken in the line *x x*, fig. 2.

Figure 2, a side view of the same.

Figure 3, a plan or top view of a boat, with my improvement applied to it.

Similar letters of reference indicate like parts.

This invention relates to a new and improved means for detaching ships' boats from their davits, and has for its object the simultaneous detachment of the hooks of both the front and rear tackle-blocks from the boat, so that the latter may be set free upon the water without the liability of being swamped or capsized in a swell or sea. The device is attached to the front and rear thwarts of the boat, and is constructed of a metal plate, A, let in the thwarts, and having two upright lugs or ears *a a*, between which a right-angular bar or hook, B, is secured by a pin, *b*, the former being allowed to work or turn freely on the latter. The hook B extends down through a hole or opening, *c*, in the plate A, and has a shoulder, *d*, upon it for an arm, *e*, on a shaft, C, to abut against and keep the upper end of the hook in about a horizontal position, and near the upper end of a projection, *f*, on plate A, as shown in black in figs. 1 and 2. When the hook B is thus secured in position, the hook D of the davit tackle may be fitted under hook B, and without the possibility of becoming detached unless the arm *e* is moved down by turning the shaft C, as shown in red outline in fig. 1. The shaft C has its bearings *g* attached to the under sides of the thwarts, one or more bearings to each thwart. These bearings hold the shaft firmly in position, and the arms *e* of both devices are attached to the same shaft so that both arms will be moved at the same time or by the same movement of the shaft C, and the hooks D of both tackle blocks liberated at the same time, a handle, E, being attached to shaft C for the purpose of turning it. In order to attach the hooks D of the tackle blocks to the front and rear thwarts, the arms *e e* are turned down so as to release the hooks B, and the hooks D are then inserted under the hooks B, the tops or upper ends of the latter pressed down, and the arms *e e* raised or turned up against the shoulders *d*, to hold the hooks B in position. When the boat is lowered so that it touches or nearly touches the water, the shaft C is turned by the cockswain or other proper person in the boat, and both hooks D D are instantly liberated from the hooks B B, and the boat set free. By this improvement, a simultaneous liberation of both ends of the boat is effected; nor by any contingency can one hook D be released before the other, and this is a very important feature, for in case one end of the boat should be liberated before the other end, it would, if there were a swell or sea, be very liable to be capsized or swamped. The hooks D also cannot become casually detached from the hooks B in lowering the boat.

Having thus described my invention, I claim as new, and desire to secure by Letters Patent—

1. The employment or use of a single shaft, C, arranged with hooks B in the manner shown, or in an equivalent way, so that by the turning of said shaft the hooks B may be simultaneously liberated, to detach the boat from the davits.

2. The hooks B, suspended or fitted in the plates A, in combination with the arms *e* attached to the shaft C, all being applied to the boat, and arranged to operate substantially in the manner as and for the purpose set forth.

THOS. HUNTINGTON.

Witnesses:

WM. F. MCNAMARA,

ALEX. F. ROBERTS.